Dec. 13, 1966  R. C. COMER  3,291,152
SELF-SEALING QUICK DISCONNECT COUPLING
Filed Jan. 7, 1964   2 Sheets-Sheet 1

INVENTOR.
ROBERT C. COMER
BY
AGENT

Dec. 13, 1966   R. C. COMER   3,291,152
SELF-SEALING QUICK DISCONNECT COUPLING
Filed Jan. 7, 1964   2 Sheets-Sheet 2

INVENTOR.
ROBERT C. COMER
BY
AGENT

United States Patent Office 3,291,152
Patented Dec. 13, 1966

3,291,152
SELF SEALING QUICK DISCONNECT COUPLING
Robert C. Comer, Rockaway Boro, N.J., assignor to Thiokol Chemical Corporation, Bristol, Pa., a Delaware corporation
Filed Jan. 7, 1964, Ser. No. 336,240
9 Claims. (Cl. 137—614.04)

This invention relates generally to valved couplings and more particularly to an improved, self sealing, valved coupling of the quick disconnect type for fluid conveying conduits.

Such couplings for fluid conveying conduits employ valve means which are usually automatically operable to close the conduits on one or both sides of the coupling when it is disconnected, and operable to open the conduits on one or both sides of the coupling when it is connected, and are well known in the art.

Such couplings also usually employ a slidable sleeve or other device which must be actuated against a spring in order to lockably connect the coupling, or to enable the disconnection thereof and such actuation is usually accomplished manually. This is impractical in high pressure applications because the spring force required to lock the coupling may be extremely high and unlocking the coupling involves moving the sleeve against the spring force. The use of external fluid pressure to actuate the sleeve has been suggested but this is also impractical in that it involves the addition of expensive equipment such as a prime mover, pumps, conduits and controls.

Accordingly, the main object of the present invention is to provide an improved, self sealing valved coupling of the quick disconnect type for use in high pressure applications which will obviate the above and other disadvantages of known prior art couplings.

An important object of the present invention is to provide an improved, self sealing, quick disconnect coupling in which the working pressure of the line or conduit is utilized to supplement the spring force required for locking the coupling when connected, and obtain the force required to disconnect the coupling.

Another important object of the present invention is to provide an improved coupling of the type described in which the sleeve respectively controls the admission of and is moved to locking position by fluid pressure introduced from the line into the spring cavity, and is moved to unlocking position against the spring by means of line pressure delivered to an uncoupling cavity.

A further important object of the present invention is to provide an improved coupling of the type described which is locked and unlocked by line fluid pressure introduced respectively as required into the spring cavity and into the uncoupling cavity, with the locking pressure fluid introduced into the former being relieved by bleeding into the latter upon unlocking of the coupling.

A still further important object of the present invention is to provide an improved quick disconnect coupling of the type described which is adaptable to any size of line and pressure; may be quickly and easily connected and disconnected in complete safety; is sturdy and of long life in use; and which is reliable in operation and susceptible of ready and economic manufacture.

Other objects and advantages of the invention will become apparent during the course of the following description.

In the drawings, I have shown one embodiment of the invention. In this showing:

Figure 1:
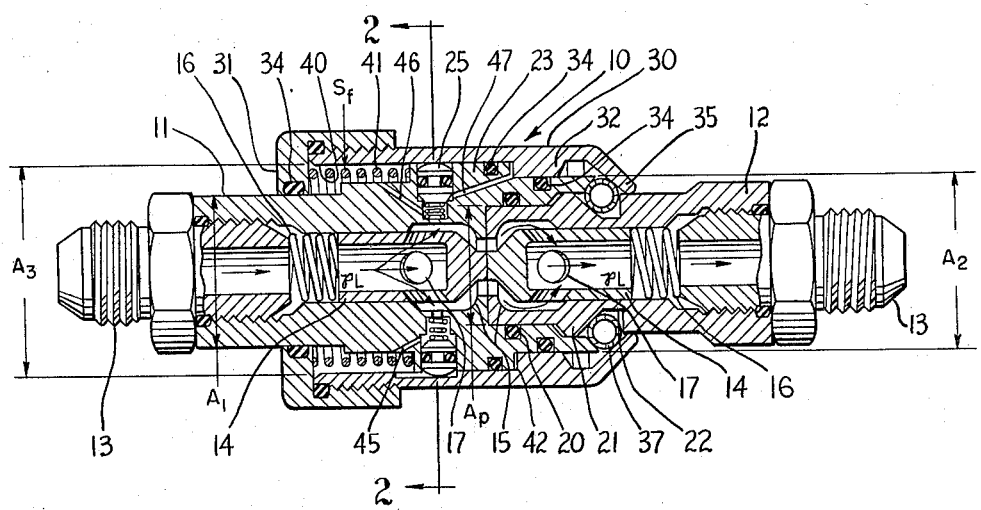
FIGURE 1 is a central, longitudinal sectional view of the coupling in connected and locked position.
Figure 2:
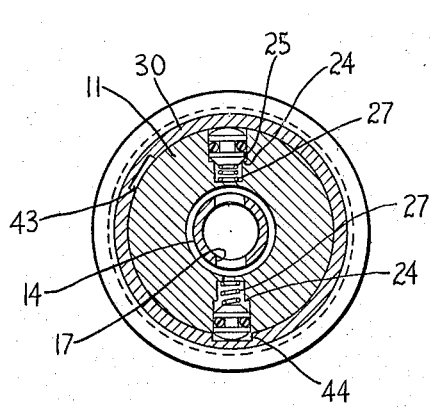
FIGURE 2 is a transverse sectional view thereof taken on the line 2—2 of FIGURE 1 with the locking and unlocking sleeve rotated to the position enabling locking of the coupling by line fluid pressure.
Figure 2:
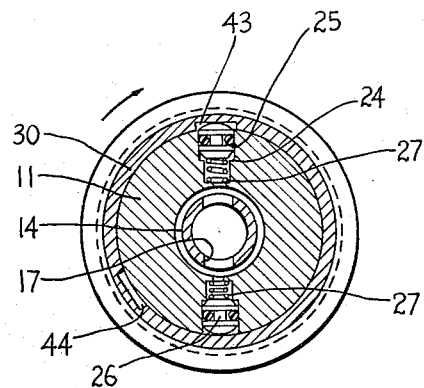
Figure 3:
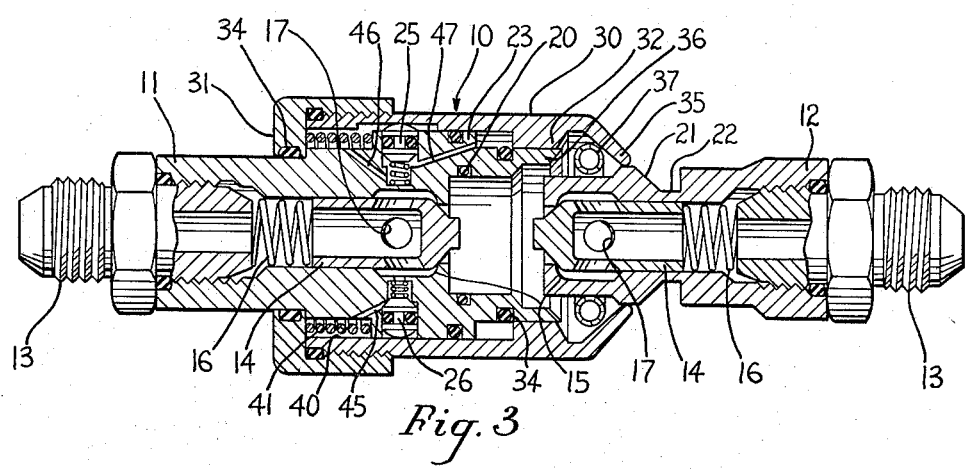
Figure 4:
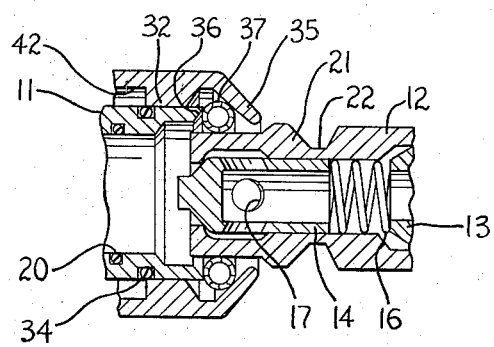

FIGURE 2' is a similar view thereof with the sleeve rotated to the position enabling unlocking and disconnection of the coupling by line fluid pressure;

FIGURE 3 is a view similar to FIGURE 1 showing the coupling in an intermediate position between connection and disconnection; and FIGURE 4 is a similar but fragmentary view showing the coupling in its initial position of engagement or in its final position of disengagement.

Referring to the drawings, numeral 10 designates the quick detachable coupling as a whole which essentially comprises a receptacle or cylinder 11 of larger diameter than and into which a cylindrical probe 12 is adapted to be fully inserted and locked to transmit high pressure fluids, which may be liquid or gaseous, to or from high pressure fluid lines or conduits by means of connecting fittings 13. A hollow, poppet valve 14 is slidably mounted in the bores of the receptacle 11 and the probe 12 and each is urged to its seat 15 (FIGURES 3 and 4), by means of a spring 16 acting against the adjacent fitting 13. The poppet valves 14 invlude circumferentially spaced ports 17 adjacent their heads which engage and move each other off of its seat 15 when the probe 12 is fully inserted in the receptacle 11 (FIGURE 1) so as to form a high pressure fluid flow passage through the coupling in either direction, one direction being indicated by the arrows.

Loss of fluid pressure between the probe 12 and the receptacle 11 is prevented by an O-ring 20. The probe is provided with a locking cone 21 terminating in a recess 22 and the receptacle is provided with a peripheral shoulder 23 having a pair of diametrical opposed ports including valve seats 24 which communicate with the bore of the receptacle and hence the pressure fluid therein. Valves 25 and 26 are mounted in the ports and urged radially outwardly away from the seats 24 by spring 27 against a slidable and rotatable sleeve 30.

The locking and unlocking sleeve 30 is slidably mounted on the shoulder 23 and includes a cap having an inner peripheral flange 31 and an inner peripheral shoulder 32 bearing on the receptacle 11, all sealed against leakage by O-rings 34. The other end of the sleeve is inwardly tapered as at 35 and co-operates with the receptacle end 36 and the cone 24 to confine a probe locking garter spring 37 in the recess 22. The garter spring is merely a helically wound spring coiled into a torus configuration and joined.

It will be noted that the co-operating flanges and shoulders of the receptacle 11 and the sleeve 30 define a spring cavity 40 in which a spring 41 is positioned to urge the sleeve to the left or locking position with respect to the receptacle 11, and an uncoupling cavity 42. The inner face of the sleeve 30 is provided with grooves 43 and 44, which when selectively aligned with the rounded heads of the valves 25 and 26, permits them to open under the action of their springs 27, the sleeve face otherwise keeping the valves closed (FIGURES 1 and 2).

The valve 26 is openable by movement into the groove 44 upon rotation of the sleeve 30 about the receptacle 11, to admit line pressure fluid to the spring cavity 40 by a passage 45, while opening of the valve 25 and closing of the valve 26 is effected by rotation of the sleeve 30 to align the valve 25 with the groove 43, the valve 26 being cammed closed by the inner face of the sleeve. The pressure trapped in the spring cavity now passes through a passage 46 and is ported through a flow-control orifice 47 to the uncoupling cavity 42.

The various forces and areas involved in the described coupling 10 which uses the working pressure of the line to supplement the spring force required for locking and obtaining the force for disconnection are shown in FIGURE 1 wherein:

$P_L$ = line pressure (p.s.i.)
$A_p$ = seal area of probe (in.$^2$)
$F_L$ = locking force (lbs.)
$F_s$ = separating force (lbs.)
$S_f$ = spring force (lbs.)
$A_1$ = minor area of spring cavity (in.$^2$)
$A_2$ = minor area of uncoupling cavity (in.$^2$)
$A_3$ = major area of both spring cavity and uncoupling cavity (in.$^2$)

$$F_s = P_L A_p \tag{1}$$

In locked position:
$$F_L \geqq F_s \tag{2}$$
where
$$F_L = P_L(A_3 - A_1) + S_f$$

Uncoupling:
$$F_s \geqq F_L \tag{3}$$
where
$$F_L = P_L(A_3 - A_1) + S_f - P_L(A_3 - A_2)$$
or
$$F_L = P_L(A_2 - A_1) + S_f$$

$(A_2 - A_1)$ must be of smaller area than $A_p$ for coupling to operate.

As shown in FIGURE 1, the coupling 10 is connected and free flow of pressure fluid is possible in either direction as the poppet valves 14 are moved off their seats 15. To lock the coupling in the connected position, the sleeve 30 is rotated to align the groove 44 with and open the valve 26 and direct fluid pressure to the spring cavity 40. It will be apparent that the greater the fluid pressure, the greater will be the locking force (see Equation 2). It will be noted that in the locked position, the garter spring is forced against both the locking cone 21 of the probe 12 and the receptacle end 36 by the sleeve 30 through its tapered portion 35 to prevent retraction of the probe 12.

To disconnect the coupling 10, the sleeve 30 is again rotated. The initial rotation cams the poppet valve 26 closed against its seat 24 which seals off the line pressure from the spring cavity 40 and then lines up the groove 43 with the valve 25. The pressure trapped in the spring cavity 40 now passes through the passage 46 and is metered through the orifice passage 47 to the uncoupling cavity 42. The orifice passage 47 monitors the flow in order to keep the speed of uncoupling to an acceptable and safe value for the operator.

The action of the pressure fluid in the uncoupling cavity 42 moves the sleeve 30 to the right (FIGURES 3 and 4) relieving the pressure of the sleeve on the locking garter spring 37 and thereby allowing the probe locking cone 21 to expand the garter spring. As the pressure becomes balanced between the spring cavity 40 and the uncoupling cavity 42, the separating force ($F_s$) pops the probe 12 out of the receptacle 11.

The forces involved, assuming a negligible pressure drop in balancing the pressure between the cavities as the worst case, is expressed by Equation 3. As the coupling disengages, the poppet valves 14 are free to be seated by their springs 16 and are held against their respective seats 15 by the line pressure and the spring force. Thus, both the probe 12 and the receptacle 11 are independently seated.

As the probe 12 pops out of the receptacle 11, it moves the sleeve 30 to the right, the probe expanding the garter spring 37 into the sleeve to enable the probe to move freely. When it is clear of the receptacle, the spring force ($S_f$) with the help of the cavity pressure action $$P_L(A_2 - A_1) + S_f$$

returns the sleeve 30 to the left where it and the receptacle end 36 hold the garter spring 37 captive (FIGURE 4). This returning action is also controlled to a safe valve by the flow control orifice 47.

It is to be understood that the form of my invention herewith shown and described is to be taken as a preferred embodiment of the same and that various changes in the shape, size, and arrangement of parts may be resorted to without departure from the spirit of the invention or the scope of the subjoined claims.

I claim:

1. In a quick disconnect coupling for high pressure fluid lines having a receptacle and a probe seated therein and both including normally closed valves automatically moved to open position in said seated position to permit flow of high pressure fluid therethrough, and sleeve means mounted on and movable with respect to the receptacle to lockably engage the probe in the receptacle; passages formed in the receptacle to direct pressure fluid to either end of the sleeve means to effect locking and unlocking movement of the sleeve means, and valve means controlling said passage and operable by the sleeve means to selectively effect said movements.

2. The combination recited in claim 1, and spring means mounted between the receptacle and the sleeve means and acting thereagainst to supplement the action of the pressure fluid in moving the sleeve means to locking portion.

3. The combination recited in claim 2 wherein the area acted on by the pressure fluid to effect unlocking movement of said slide means is greater then the area acted on to effect locking movement thereof to overcome the supplemental action of said spring means.

4. The combination recited in claim 1 wherein the probe includes a peripheral cone terminating in a recess, and the sleeve means includes an extensible ring movable over said cone into said recess and clampable therein by the sleeve upon locking movement of the latter to prevent unseating of the probe.

5. The combination recited in claim 4 wherein said extensible ring comprises a garter spring.

6. The combination recited in claim 1 wherein said valve means are held closed by the sleeve means, and a groove is formed on the inner surface of said movable sleeve means for alignment with said valve means to permit opening thereof.

7. The combination recited in claim 1 wherein said valve means comprises a pair of valves, one of said valves controlling pressure fluid flow to effect locking movement of said slide means and the other of said valves controlling said flow to effect unlocking movement thereof.

8. The combination recited in claim 1 wherein said valves are spaced and held in closed position by the sleeve means, and a groove is formed on the inner surface of said movable sleeve means for selective alignment with one of said valves to permit opening thereof.

9. The combination recited in claim 5 wherein said sleeve means is rotated to effect alignment of said groove with a valve.

References Cited by the Examiner
UNITED STATES PATENTS

| | | | |
|---|---|---|---|
| 1,859,018 | 6/1928 | Bedford | 251—149.6 |
| 2,800,343 | 3/1955 | Ulrich | 137—614.04 |

WILLIAM F. O'DEA, *Primary Examiner.*

H. COHN, *Assistant Examiner.*